(12) United States Patent
Kim et al.

(10) Patent No.: US 7,532,599 B2
(45) Date of Patent: May 12, 2009

(54) APPARATUS AND METHOD FOR ALLOCATING USER IN A MULTIPLE ANTENNA MOBILE COMMUNICATION SYSTEM SUPPORTING MULTI-USER DIVERSITY

(75) Inventors: Eung-Sun Kim, Suwon-si (KR); Jae-Sang Ham, Yongin-si (KR); Jong-Hyeuk Lee, Seongnam-si (KR); Chung-Yong Lee, Seoul (KR); Sei-Joon Shim, Seoul (KR); Kyeong-Yeon Kim, Seoul (KR)

(73) Assignees: Samsung Electronics Co., Ltd (KR); Yonsei University (KR)

( * ) Notice: Subject to any disclaimer, the term of this patent is extended or adjusted under 35 U.S.C. 154(b) by 448 days.

(21) Appl. No.: 11/374,735

(22) Filed: Mar. 14, 2006

(65) Prior Publication Data
US 2006/0203777 A1   Sep. 14, 2006

(30) Foreign Application Priority Data
Mar. 14, 2005   (KR) .................. 10-2005-0021190

(51) Int. Cl.
| | |
|---|---|
| *H04W 4/00* | (2006.01) |
| *H04W 72/00* | (2006.01) |
| *H04J 11/00* | (2006.01) |
| *H03C 7/02* | (2006.01) |
| *H04B 1/02* | (2006.01) |
| *H04B 7/02* | (2006.01) |
| *H04B 17/02* | (2006.01) |
| *H04B 1/00* | (2006.01) |
| *H04B 7/00* | (2006.01) |

(52) U.S. Cl. .............. 370/334; 370/203; 370/329; 455/101; 455/133; 455/450; 455/69

(58) Field of Classification Search ............ 370/334
See application file for complete search history.

(56) References Cited

U.S. PATENT DOCUMENTS

2003/0125040 A1   7/2003   Walton et al.

(Continued)

FOREIGN PATENT DOCUMENTS

EP         1 575 203         9/2005

(Continued)

OTHER PUBLICATIONS

Long Bao Le et al., On the Performance of Spatial Multiplexing MIMO Cellular Systems with Adaptive Modulation and Scheduling, 2004 Wireless Communications and Networking Conference, Mar. 21-25, 2004.

(Continued)

*Primary Examiner*—Nick Corsaro
*Assistant Examiner*—Tangela T. Chambers
(74) *Attorney, Agent, or Firm*—The Farrell Law Firm, PC

(57) ABSTRACT

A user allocating apparatus and method in a multiple antenna mobile communication system supporting multi-user diversity is provided. Each user calculates effective Signal-to-Interference Noise Ratios (SINRs) and bit loading over every possible detection order and selects a detection order maximizing the number of channels with a minimum product of the minimum symbol distance of a modulation scheme and an effective SINR, thereby minimizing an average error probability. A base station receives detection orders from users and selects a user with a maximum detection order value. The base station then transmits data to the selected user using modulation schemes determined by the user for the transmit antennas.

10 Claims, 3 Drawing Sheets

U.S. PATENT DOCUMENTS

| | | | |
|---|---|---|---|
| 2003/0157954 A1* | 8/2003 | Medvedev et al. | 455/522 |
| 2004/0002364 A1* | 1/2004 | Trikkonen et al. | 455/562.1 |
| 2004/0038653 A1* | 2/2004 | Claussen et al. | 455/130 |
| 2004/0083082 A1* | 4/2004 | Onggosanusi et al. | 703/2 |
| 2005/0075081 A1* | 4/2005 | Catreux-Erceg et al. | 375/299 |
| 2005/0147183 A1* | 7/2005 | Willink | 375/299 |
| 2008/0075022 A1* | 3/2008 | Lei et al. | 370/310 |

FOREIGN PATENT DOCUMENTS

WO    WO 2004034660 A1 *  4/2004

OTHER PUBLICATIONS

Kyeongyeon Kim et al., A Simplified Ordering Scheme Minimizing Average BER for MIMO Systems with Adaptive Modulation, IEICE Transactions on Communications, Nov. 11, 2005.

Jaesang Ham et al., A New Multiuser Diversity Scheme Exploiting Detection Order for AM-OSIC System, 2005 Vehicular Technology Conference, May 30, 2005.

* cited by examiner

APPARATUS AND METHOD FOR ALLOCATING USER IN A MULTIPLE ANTENNA MOBILE COMMUNICATION SYSTEM SUPPORTING MULTI-USER DIVERSITY

PRIORITY

This application claims priority under 35 U.S.C. § 119 to an application entitled "Apparatus and Method for Allocating User in a Multiple Antenna Mobile Communication System Supporting Multi-User Diversity" filed in the Korean Intellectual Property Office on Mar. 14, 2005 and assigned Serial No. 2005-21190, the contents of which are incorporated herein by reference.

BACKGROUND OF THE INVENTION

1. Field of the Invention

The present invention relates generally to a user allocating apparatus and method in a multiple antenna mobile communication system, and in particular, to an apparatus and method for allocating a user in a multiple antenna mobile communication system supporting multi-user diversity.

2. Description of the Related Art

Unlike a wired channel environment, a radio channel environment typically has low reliability due to multipath interference, shadowing, wave attenuation, time-variant noise, and interference. The low reliability is an obstacle to increasing data rate. Major examples of many techniques developed to overcome this problem are error control coding and diversity. The former suppresses the effects of signal distortion and noise and the latter combats fading by independently receiving a plurality of signals experiencing fading.

Diversity schemes are categorized into time diversity, frequency diversity, multipath diversity, and spatial diversity. Time diversity achieves diversity in time by combining channel encoding with interleaving. In frequency diversity, signals are transmitted at different frequencies and thus in different paths. Multipath diversity is a scheme of achieving diversity by distinguishing multipath signals using different fading information. Spatial diversity is characterized in that both a transmitter and a receiver use a plurality of antennas and achieve diversity by using independent fading signals. Spatial diversity uses an antenna array.

However, the error control coding technology and the diversity schemes for radio channels are not effective in satisfying the demands for high-speed data service, such as Internet connection and multimedia service. Since provisioning of the high-speed data service requires increased frequency efficiency, a mobile communication system having an antenna array is studied correspondingly.

An antenna array system seeks to increase frequency efficiency in the space domain using multiple antennas at the transmitter and the receiver. Considering that time and frequency resources are limited, it is easy to further increase data rate by utilizing the space domain. Such antenna array systems are Vertical Bell Lab Layered Space Tome (V-BLAST) proposed by Bell Labs and space division multiplexing. Since each antenna transmits information independently, these antenna array systems are essentially Multi-Input Multi-Output (MIMO) systems.

To increase capacity with high frequency efficiency, the channels between transmit antennas and receive antennas must have small correlation coefficients in the antenna array systems, so that information transmitted from the transmit antennas experience different channels and thus can be identified at a Mobile Station (MS). That is, a signal transmitted from each transmit antenna must have a different spatial characteristic, for identification at the MS, thereby leading to an increase of channel capacity. The antenna array systems are suitable for multipath signals with different spatial characteristics. However, the increase of capacity is not great in a Line Of Sight (LOS) environment, as compared to a single transmit/receive antenna system. Hence, the antenna array systems are feasible in a rich-scattering environment with multipath signals and low correlation coefficients between the transmit and receive antennas, i.e. in a diversity-effective environment.

The use of an antenna array at the transmitter/receiver generally increases channel capacity. The channel capacity is dependent on whether the transmitter/receiver has knowledge of channel information. If both the transmitter and the receiver have channel information, the channel capacity is highest, and if neither the transmitter nor the receiver has channel information, the channel capacity is lowest. If only the receiver has channel information, the channel capacity increase is between the two cases.

To acquire the channel information, the transmitter estimates channel condition on its own, or receives feedback information about the channel condition. The channel information required in the antenna array system is the channel response between the transmit antennas and the receive antennas. Therefore, the channel information increases in proportion to the number of the transmit/receive antennas.

In the antenna array system, including multiple transmit/receive antennas, the channel capacity increases in proportion to the number of available antennas in the transmitter/receiver. On the other hand, in the case of feedback of the channel information, the amount of the feedback information increases with the number of the antennas. Accordingly, a need exists for increasing the channel capacity with a reduced amount of feedback information.

As previously described, a conventional Spatial Multiplexing (SM)-MIMO system adopts V-BLAST for reception. V-BLAST relies on interference cancellation which is performed by forward ordering detection or reverse ordering detection. In the forward ordering detection, a subchannel with the highest Signal-to-Interference Noise Ratio (SINR) is selected first of all at each step. The forward ordering detection is suitable for Equal Power (EP) and Equal Rate (ER) for each subchannel. In case of optimal bit allocation and power allocation, the reverse ordering detection first detects a channel with a lower SINR. That is, detection is performed in an ascending order of SINR.

FIG. 1 is a block diagram of a conventional SM-MIMO system using forward ordering detection and reverse ordering detection. The SM-MIMO system using adaptive modulation detects a signal on a substream-by-substream basis by V-BLAST. An effective Signal-to-Interference Ratio (SIR) and bit loading calculator selects the forward ordering or the reverse ordering according to SIR. The forward ordering and the reverse ordering are expressed as formulas in FIG. 1, which are computed to determine an optimal detection order in the effective SIR and bit loading calculator. The forward ordering is based on the assumption of EP and ER, whereas the reverse ordering is based on the assumption of Power Allocation (PA) and Adaptive Rate (AR). The effective SIR and bit loading calculator provides the determined optimal detection order to a V-BLAST portion. The V-BLAST portion receives signals through a plurality of antennas according to the optimal detection order.

These conventional forward and reverse ordering detection techniques take into account only SINR in Successive Interference Cancellation (SIC). As a result, they are not efficient in terms of minimization of an average error probability determined by the minimum symbol distance of a modulation and a received SINR. Moreover, they operate for a single user and thus not suitable for a mobile communication system with multi-user diversity. Therefore, scheduling for a plurality of users is required to optimize error probability performance to support multi-use diversity in the conventional multiple antenna system.

SUMMARY OF THE INVENTION

An object of the present invention is to substantially solve at least the above problems and/or disadvantages and to provide at least the advantages below. Accordingly, the present invention provides a user allocating apparatus and method for optimizing error probability performance in a multiple antenna system supporting multi-user diversity.

The present invention provides an apparatus and method for selecting an MS with a low error probability based on feedback information received from a plurality of MSs. The present invention also provides an apparatus and method for selecting an MS based on information about detection orders and bit loading patterns received from a plurality of MSs. The present invention further provides an apparatus and method for determining a detection order and a bit loading pattern that minimize error probability in an MS. The present invention additionally provides an apparatus and method for determining a detection order and a modulation scheme for each antenna which minimize error probability based on the minimum symbol distances of modulation schemes and SINR which actually affect the error probability, irrespective of a bit loading algorithm in each MS with an SIC receiver, and selecting an MS that minimizes the error probability of a system according to the detection orders and modulation schemes received from the MSs in a transmitter.

According to an aspect of the present invention, in a method of allocating a terminal in an SM-MIMO system, a detection order that minimizes the highest of the error probabilities of a plurality of channels is determined for each terminal. A terminal corresponding to an error probability that minimizes the average of the error probabilities used to determine detection orders in terminals is selected, and a modulation scheme is determined for each antenna according to a detection order determined by the selected user.

According to another aspect of the present invention, in an SM-MIMO system, a terminal determines a detection order that minimizes the highest of the error probabilities of a plurality of channels. A base station selects a terminal corresponding to an error probability that minimizes the average of the error probabilities used to determine detection orders in terminals, and determines a modulation scheme for each antenna according to a detection order determined by the selected user.

According to a further aspect of the present invention, in a method of selecting a terminal and transmitting data to the selected terminal in a base station in an SM-MIMO system using equal power and adaptive rate for a plurality of transmit antennas, the base station receives from each of the terminals information about a detection order determined by the each terminal and information about modulation schemes for the transmit antennas determined according to the detection order by the each terminal. The base station creates detection orders according to the detection order information received from the each terminal, selects a detection order that minimizes an average error probability among the created detection orders, determines modulation schemes for the transmit antennas according to the modulation scheme information corresponding to the selected detection order, and transmits data for a terminal corresponding to the detection order using the determined modulation schemes.

According to still another aspect of the present invention, in an apparatus for selecting a terminal and transmitting data to the selected terminal in a base station in an SM-MIMO system using equal power and adaptive rate for a plurality of transmit antennas, a user allocator selects a detection order that minimizes an average error probability among detection orders created based on information about a detection order received from each of a plurality of terminals. An adaptive modulator determines modulation schemes for the transmit antennas according to information about modulation schemes for the transmit antennas received from a terminal corresponding to the selected detection order, and transmits data to the terminal using the determined modulation schemes.

According to yet another aspect of the present invention, in a method of selecting a terminal and transmitting data to the selected terminal by a base station in an SM-MIMO system using equal power and adaptive rate for a plurality of transmit antennas, the effective SINR of each of the channels is calculated over every possible detection order in each of a plurality of terminals. A detection order that maximizes the number of channels with a minimum product of the minimum symbol distance of a modulation scheme and an effective SINR among the detection orders is selected in each terminal. Information about the minimum symbols distance and the effective SINR corresponding to the selected detection order and information about a modulation scheme for each transmit antenna determined according to the selected detection order is transmitted from each terminal to the base station. The detection orders selected by the terminals are created based on the minimum symbol distances and the effective SINRs received from the terminals, and a detection order that minimizes an average error probability among the detection orders is selected in the base station. Modulation schemes are determined for the transmit antennas according to modulation scheme information corresponding to the selected detection order in the base station. Data is transmitted using the determined modulation schemes from the base station.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
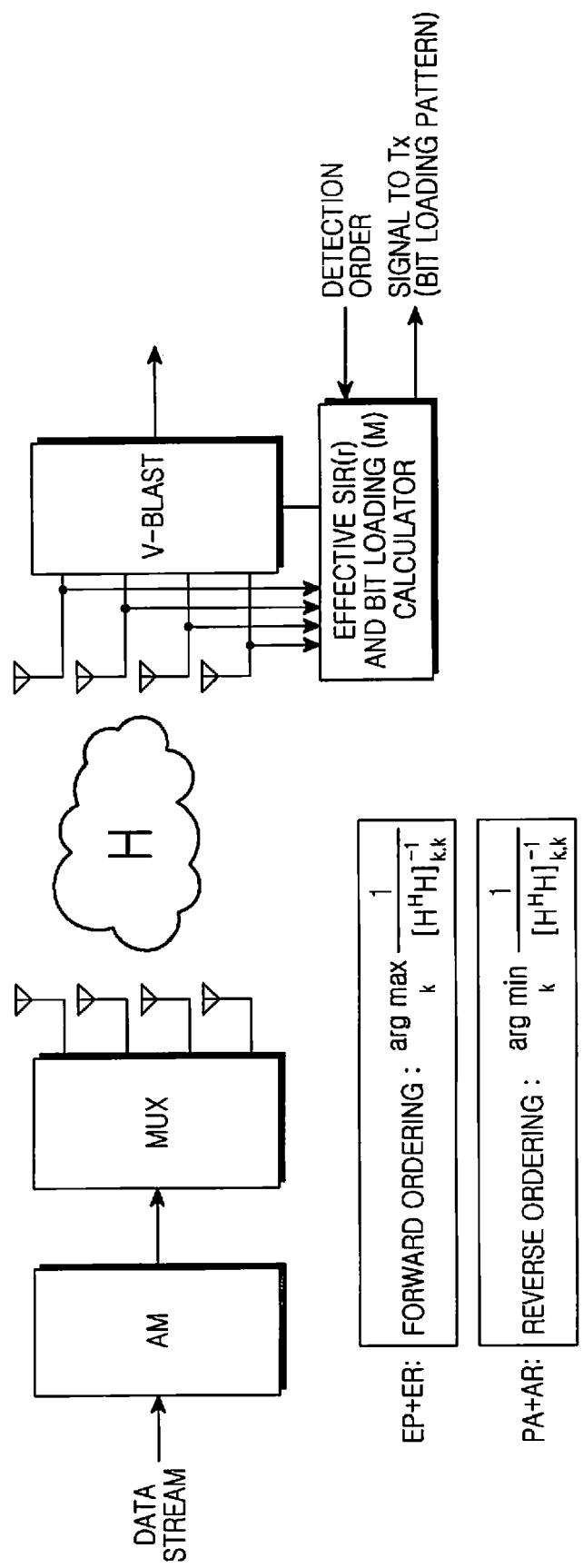
FIG. 1 is a block diagram of a transmitter and a receiver for determining a detection order in a conventional SM-MIMO system using adaptive modulation and demodulation.

Preferred embodiments of the present invention will be described herein below with reference to the accompanying drawings. In the following description, well-known functions or constructions are not described in detail since they would obscure the invention in unnecessary detail.

The present invention provides an apparatus and method for selecting a user with the lowest error probability based on information about detection orders minimizing error probability received from a plurality of users. The average error probability of the system is decreased in two steps according to the present invention.

Step 1: Each user determines a detection order minimizing error probability and a modulation scheme for each antenna corresponding to the detection order. In general, a channel with the highest error probability affects an average error probability most significantly. Hence, it is optimal to select a detection order that minimizes the effects of the channel with the highest error probability. For this purpose, the minimum symbol distance of a modulation scheme as well as received SINR is considered in selecting an optimal detection order. In other words, a detection order minimizing the average error probability determined by the received SINR and the minimum symbol distance of a modulation scheme is selected.

For each transmit antenna, hence, the product of the minimum symbol distance of a selected modulation scheme and an effective SINR is calculated, and a detection order is selected such that the most transmit antennas (or channels) minimize the product. This is termed an optimal detection order. As signals are received in the optimal detection order, the average error probability is minimized.

In accordance with the present invention, an optimal detection order is determined in the context of a system with EP and AR, while achieving performance close to that achieved by ordering with PA and AR using less feedback information.

Step 2: A user with the lowest error probability is selected based on parameters and information about modulation schemes for respective antennas received from a plurality of users, and data is transmitted to the selected user using adaptive modulation for each antenna. That is, a user having the maximum of the products of minimum symbol distances and effective SINRs from a plurality of users is selected as one minimizing the error probability and modulation schemes are determined for the respective antennas according to a bit loading pattern received from the selected user.

Herein below, a detailed description will be made of a generalization of a formula for determining an optimal detection order, and a structure for determining the optimal detection order by the generalized formula. An operation for selecting a user having the lowest error probability in a Base Station (BS) is also described.

A. Method of Determining Optimal Detection Order

A formula for minimizing the average error probability expressed as the product of the minimum symbol distance of a modulation scheme and an effective SINR is derived as follows.

Typically, the average error probability, $P_{b,k}$ can converge to an exponential function within an error of 1 dB, as expressed by Equation (1):

$$P_{b,k} \cong C \exp(-g_{M,k} \cdot SINR_k) \tag{1}$$

where C is a constant (=0.2), k is the index of a transmit antenna, M is a modulation order, $g_M$ is a constant being the minimum symbol distance of the modulation scheme, and $SINR_k$ is the effective SINR of a $k^{th}$ antenna. As noted from Equation (1), the average error probability increases in proportion to the product of the minimum symbol distance of a modulation scheme and an effective SINR.

For $g_M$=M-ary Phase Shift Keying (PSK), and $g_M$=M-ary Quadrature Amplitude Modulation (QAM), $g_{PSK}$ is expressed as Equation (2):

$$g_{PSK} = \sin^2\left(\frac{\pi}{M}\right), \; g_{S-QAM} = \frac{1.5}{M-1} \tag{2}$$

where M is 2 for the M-ary PHS and M is 16 for the M-ary QAM.

$SINR_k$ in Equation (1) is the product of the Signal-to-Noise Ratio (SNR) ρ/r of the $k^{th}$ channel, determined by its transmit power (SIR) and its noise, and the Signal-to-Interference Ratio (SIR) $\gamma_k$ of the $k^{th}$ channel $SINR_k$ is expressed as Equation (3):

$$SINR_k = \frac{\rho}{r}\gamma_k, \; \gamma_k = \frac{1}{[(H^H H)^{-1}]_{k,k}} \tag{3}$$

where $\rho(=P_T/\sigma^2)$ is a total SNR and r is the number of channels with non-zero bits.

Referring to Equation (3), in the case of EP for each channel, division of the total SNR by the number of channels with non-zero bits results in the SNR of each channel (i.e. ρ/r). If SIC is used to obtain $\gamma_k$, H denotes a channel matrix from which already-detected channels are cancelled by SIC. For example, if H is expressed as two columns vectors $\underline{h}_1$ and $\underline{h}_2$ for two transmit/receive antennas, as Equation (4):

$$H=[\underline{h}_1, \underline{h}_2] \tag{4}$$

the effective SIR of each transmit antenna, $\gamma_k$ in a zero forcing receiver is Equation (5):

$$\gamma_k = \frac{1}{[(H^H H)^{-1}]_{k,k}} k = 1, 2 \tag{5}$$

If the effective SIR of a signal transmitted from one of the two transmit antennas is selected, the channel matrix and effective SIR of a signal transmitted from the other transmit antenna are given by Equation (6):

$$\hat{H} = [\underline{h}_2], \; \gamma_k = \frac{1}{\left[\left(\hat{H}^H \hat{H}\right)^{-1}\right]_{k,k}} k = 2 \tag{6}$$

The above example is based on the assumption of a detection order in which the effective SIR of the signal from the first transmit antennas is measured earlier than that of the signal from the second transmit antenna. Yet, the opposite detection order is also available.

Since the effective SINR of each channel varies depending on the detection order used, the modulation scheme of each channel also changes according to the detection order. Therefore, effective SINRs are calculated over every possible detection order and the number of bits to be allocated to each channel is determined in order to reduce an actual error probability in the present invention. The average error probability is given as Equation (7):

$$P_b \cong \frac{C}{r} \sum_k \exp(-g_{M_{ik}} \cdot SINR_{ik}) \leq C\exp(-g_{M_{iK}} \cdot SINR_{iK}) \quad (7)$$

$K$ = index of the smallest$(g_{M,k} \cdot SINR_k)$ where i is the index of a detection order. For $M_T$ transmit antennas, $M_T!$ detection orders exist.

The upper bound of the average error probability can be computed using a channel with the highest error probability by Equation (7). Hence, minimization of the average error probability is equivalent to maximization of the highest error probability, that is, $g_{M_{iK}} \cdot SINR_{iK}$. As the total SNR, ρ is constant irrespective of detection orders, a detection order that minimizes the average error probability is calculated by the following generalized formula and a corresponding modulation scheme for each antenna is determined according to Equation (8).

$$\max_{i(\text{detection order})} \left( \min_{k(\text{Tx antenna})} \frac{g_{M_{ik}} \gamma_{ik}}{r_i} \right) \quad (8)$$

As described above, effective SINRs are calculated over every possible detection order and then bit allocation is performed. A detection order minimizing the product of the minimum symbol distance of a modulation scheme, $g_{M_{ik}}$ and an effective SINR, $SINR_{ik}$ is selected in the present invention.

In this way, the average error probability can be minimized. In the case where the number of antenna increases, a detection order minimizing the product of the minimum symbol distance of a modulation scheme, $g_{M_{ik}}$ and an effective SINR, $SINR_{ik}$ is selected between the forward ordering and the reverse ordering, without considering every possible detection order. This method of determining an optimal detection order performs almost as well as the method of determining an optimal detection order among all possible detection orders.

B. Apparatus for Determining Optimal Detection order

In an apparatus for determining an optimal detection order according to the present invention, modulation schemes and effective SIRs are calculated for transmit antennas sequentially for all possible detection orders, and then an optimal detection order is determined by Equation (7). The optimal detection order is provided to a V-BLAST portion so that signals can be received from the transmit antennas with a minimum average error probability.

Figure 2:
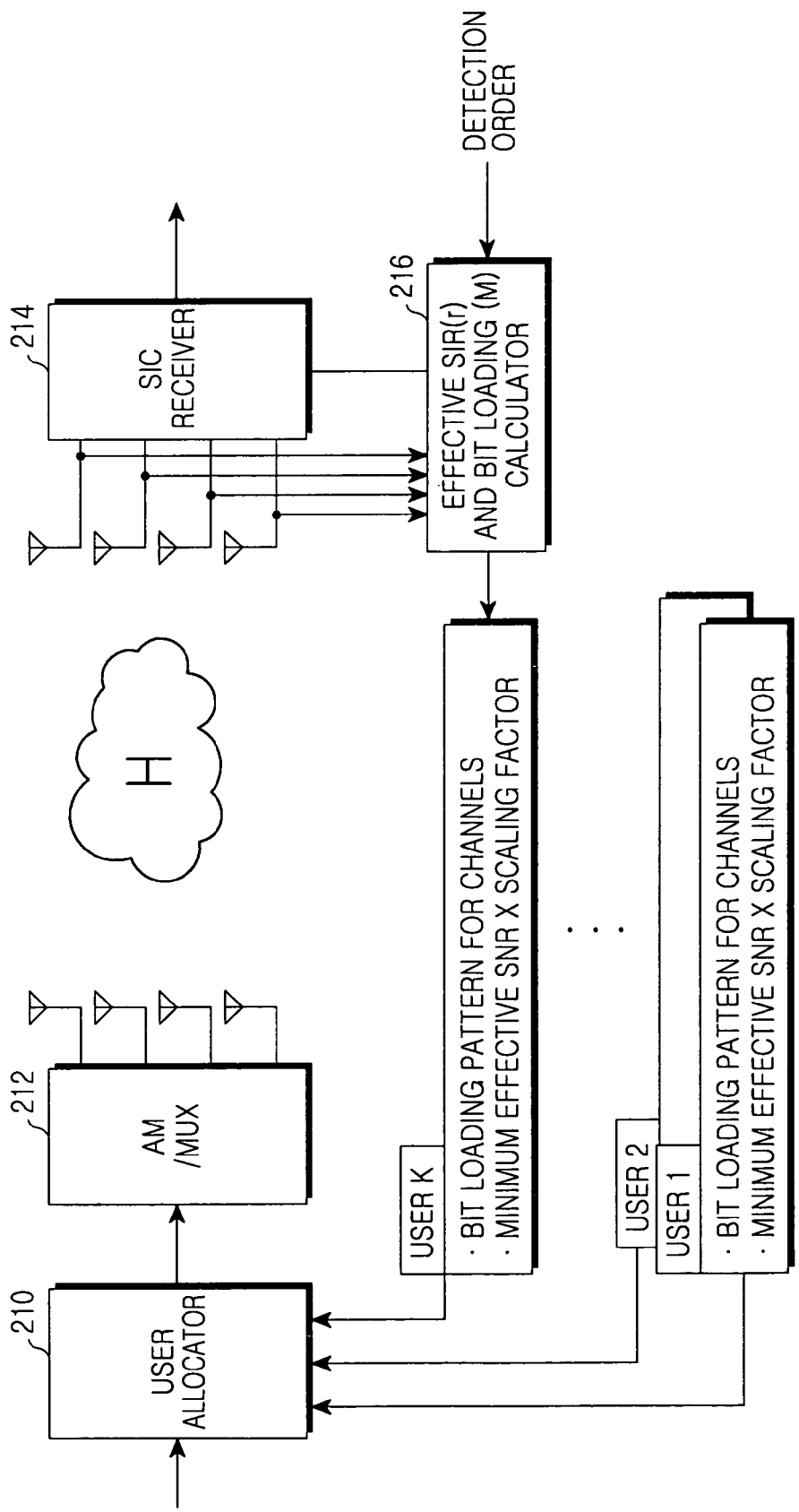
FIG. 2 is a block diagram of a transmitter and a receiver for determining a detection order in an SM-MIMO system using adaptive modulation and demodulation according to the present invention.

FIG. 2 is a block diagram of a transmitter and a receiver for determining an optimal detection order minimizing an average error probability in an SM-MIMO system using adaptive modulation and demodulation according to the present invention. An SIC receiver 214 detects signals received through a plurality of antennas on a substream-by-substream basis in an optimal detection order. The optimal detection order is determined by an effective SIR and bit loading calculator 216.

The effective SIR and bit loading calculator 216 receives the indexes of all possible detection orders, for determining the optimal detection order. Upon receipt of the index of a detection order, the effective SIR and bit loading calculator 216 applies the detection order to Equation (7) and Equation (8). The effective SIR and bit loading calculator 216 calculates effective SIRs by Equation (3) and then bit loading for the respective channels (or transmit antennas) according to the detection order. The bit loading corresponds to a modulation scheme for each transmit antenna.

The effective SIR and bit loading calculator 216 determines the optimal detection order by applying the effective SIRs and modulation schemes for the channels to Equation (7) for every detection order. The optimal detection order expressed as the products of minimum symbol distances and effective SINRs and a bit loading pattern resulting form the bit loading calculation are fed back to the BS.

C. Method of Allocating User

A description will now be made of a method of selecting a user that minimizes an average error probability from the BS.

The BS receives information about detection orders and bit loading patterns from users. A detection order is expressed as products of minimum symbol distances and effective SINRs, and a bit loading pattern represents modulation schemes for respective transmit antennas. The BS compares the detection orders and selects a user having a maximum detection order value, that is, maximum products of minimum symbol distances and effective SINRs. The BS then selects data to be transmitted to the selected user and transmits the selected data through the transmit antennas. Modulation schemes for the transmit antennas are determined according to the bit loading pattern of the selected user. That is, the transmit antennas transmit data by the modulation schemes determined by the selected user.

The above user selection in the BS is generalized to Equation (9):

$$\max_{u(\text{users})} \left( \max_{i(\text{detection order})} \left( \min_{k(\text{Tx antenna})} \frac{g_{M_{ik}} \gamma_{ik}}{r_i} \right) \right) \quad (9)$$

Equation (9) reveals that the BS selects a detection order having a maximum value among the received detection orders. That is, after checking the detection orders and modulation schemes for antennas received from the users, the BS selects a user that minimizes the average error probability of the system by Equation (9).

As described above, each user calculates effective SINRs and the numbers of data bits over every possible detection order and selects a detection order that maximizes the number of channels having a minimum product of the minimum symbol distance of a modulation scheme and an effective SINR. Then a user with a maximum detection order value is selected and a modulation scheme is applied for each antenna for the selected user. In this manner, an average error probability is minimized.

In FIG. 2, a user allocator 210 receives the detection orders and bit loading patterns from the users and selects a detection order having a maximum value as determined by Equation (9). Then the user allocator 210 allocates the user having the selected detection order. Data to be transmitted to the allocated user is provided to an Adaptive Modulator (AM) and multiplexer (MUX) 212.

The AM and MUX 212 multiplexes the user data according to the number of the transmit antennas and modulates the multiplexed data with the modulation schemes for the respective transmit antennas, determined according to the bit loading pattern of the allocated user, prior to transmission.

D. Simulation of the Present Invention

The simulation was performed under the environment of Table 1.

TABLE 1

| Bit loading Algorithm | Chow's algorithm |
|---|---|
| Modulation | No Trans. Binary Phase Shift Keying (BPSK), Quadrature Phase Shift Keying (QPSK), 8PSK, 16QAM |
| Detection | ZF, V-BLAST, ZF-OSIC |
| Active User | 1, 10. 100 |
| Antenna Configuration | 2 × 2 |
| Channel Model | Rayleigh flat fading |

The simulation is for an SM-MIMO system with EP and AM where each user uses a Zero-Forcing Ordered Successive Interference Cancellation (ZF-OSIC) receiver.

In the present invention, a detection order is selected as optimal among all possible detection orders, which maximizes the number of channels having a minimum product of the minimum symbol distance of a modulation scheme and an effective SINR. The modulation schemes and effective SINRs for the respective antennas corresponding to the optimal detection order are fed back to the transmitter. The transmitter thus selects a user which minimizes the average error probability and allocates as many bits as the modulation schemes to the respective corresponding transmit antennas, for data transmission to the user.

Figure 3:
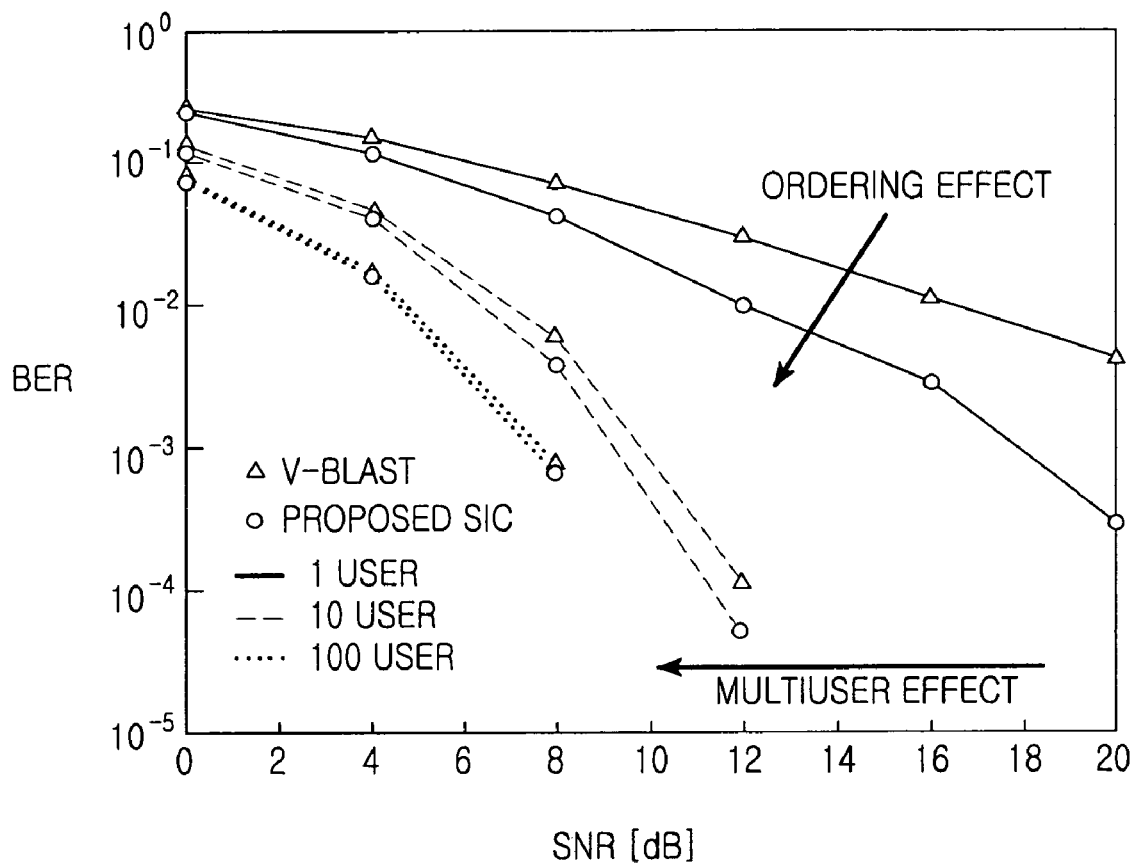
FIG. 3 is a graph comparing the performance of the present invention with a conventional scheme.

FIG. 3 is a graph comparing the performance of the present invention with a conventional scheme. The conventional scheme is V-BLAST with forwarding ordering detection, and the performance is measured as Bit Error Rate (BER) versus SNR with respect to changing numbers of users in the conventional scheme and the present invention. As the number of users increases, user diversity gain results, thereby increasing performance. The system of the present invention outperforms the conventional V-BLAST system.

Compared to the V-BLAST scheme which transmits data at an equal rate through each antenna irrespective of channels and applies the forward ordering detection based on the SINRs of the channels, the present invention takes into account both the SINRs of the channels and associated modulation schemes over every possible detection order. After determining a detection order minimizing the average error probability and modulation schemes suitable for the channels, the transmitter selects a user that minimizes the average error probability and transmits data to the selected user with modulation schemes suitable for the user. Therefore, the present invention offers better performance than the conventional V-BLAST.

In accordance with the present invention as described above, in a system with EP and AR, a detection order that maximizes the number of channels with a minimum product of the minimum symbol distance of a modulation scheme and an effective SINR is selected for each user, thereby minimizing the average error probability of the user. Then a user having the minimum of the minimum average error probabilities is selected. A transmitter simply applies feedback information about a modulation scheme for each antenna suitable for the user calculated at the receiver of the user for data transmission to the user, thereby simplifying the transmission process. The present invention advantageously can determine a detection order with a reduced error rate, and offers the same performance as an optimal ordering detection, with a lesser amount of computation in terms of error rate.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of allocating a terminal in a spatial multiplexing multi-input multi-output (SM-MIMO) system, the method comprising the steps of:

calculating, by each of a plurality of terminals, an effective signal-to-interference noise ratio (SINR) of each of a plurality of channels over each of a plurality of possible detection orders;

selecting, by each of the terminals, a detection order that minimizes a highest of error probabilities of the channels from among the detection orders, wherein each of the error probabilities is based on a product of a minimum symbol distance of a modulation scheme to be used in one of the channels and the effective SINR of the one of the channels;

transmitting, by each of the terminals, to a base station, the selected detection order and modulation schemes to be used in the channels in accordance with the selected detection order;

selecting, by the base station, a terminal with a lowest average of the error probabilities from among the terminals using detection orders received from the terminals; and setting, by the base station, the modulation schemes to be used in the channels, according to the detection order corresponding to the selected terminal, wherein the detection order selecting step comprises selecting the detection order by $$\max_{i(\text{detection order})} \left( \min_{k(Tx\ antenna)} \frac{g_{M_{ik}} \gamma_{ik}}{r_i} \right)$$

where i is the index of the detection order, k is the index of a transmit antenna, $g_M$ is a constant being the minimum symbol distance of the modulation scheme, $\gamma$ is a signal-to-interference ratio (SIR) of the one of the channels, and r is a number of the channels with non-zero bits.

2. The method of claim 1, wherein the terminal selecting step comprises selecting the terminal by $$\max_{u(users)} \left( \max_{i(\text{detection order})} \left( \min_{k(Tx\ antenna)} \frac{g_{M_{ik}} \gamma_{ik}}{r_i} \right) \right)$$

where u is the index of a user, where i is the index of the detection order, k is the index of a transmit antenna, $g_M$ is the constant being the minimum symbol distance of the modulation scheme, $\gamma$ is the SIR of the one of the channels, and r is the number of the channels with non-zero bits.

3. A method of selecting a terminal and transmitting data to the selected terminal in a base station in a spatial multiplexing multi-input multi-output (SM-MIMO) system using equal power and adaptive rate for a plurality of transmit antennas, the method comprising the steps of:

receiving from each of a plurality of terminals a detection order and modulation schemes to be used in a plurality of channels in accordance with the detection order, wherein the detection order indicates a detection order that minimizes a highest of error probabilities of the channels from among a plurality of possible detection orders, and each of the error probabilities is based on a product of a minimum symbol distance of a modulation scheme to be used in one of the channels and the effective SINR of the one of the channels;

selecting a terminal with a lowest average of the error probabilities from among the terminals using detection orders received from the terminals;

setting the modulation schemes to be used in the channels according to the detection order corresponding to the selected terminal; and transmitting data using the modulation schemes to the selected terminal, wherein the terminal selecting step comprises selecting the terminal by $$\max_{u(userT)} \left( \max_{i(detection\ order)} \left( \min_{k(Tx\ antenna)} \frac{g_{M_{ik}} \gamma_{ik}}{r_i} \right) \right)$$

where u is the index of a user, where i is the index of the detection order, k is the index of a transmit antenna. $G_M$ is a constant being the minimum symbol distance of the modulation scheme, γ is a signal-to-interference ratio (SIR) of the one of the channels, and r is a number of the channels with non-zero bits.

4. The method of claim 3, wherein the detection order selecting step comprises selecting the detection order by $$\max_{u(userT)} \left( \max_{i(detection\ order)} \left( \min_{k(Tx\ antenna)} \frac{g_{M_{ik}} \gamma_{ik}}{r_i} \right) \right)$$

where u is the index of a user, where i is the index of the detection order, k is the index of a transmit antenna, $g_M$ is the constant being the minimum symbol distance of the modulation scheme, γ is the SIR of the one of the channels, and r is the number of the channels with non-zero bits.

5. An apparatus for selecting a terminal and transmitting data to the selected terminal in a base station in a spatial multiplexing multi-input multi-output (SM-MIMO) system using equal power and adaptive rate for a plurality of transmit antennas, the apparatus comprising:

a user allocator for receiving from each of a plurality of terminals a detection order and modulation schemes to be used in a plurality of channels in accordance with the detection order, and selecting a terminal with a lowest average of the error probabilities from among the terminals using detection orders received from the terminals, wherein the detection order indicates a detection order that minimizes a highest of error probabilities of the channels from among a plurality of possible detection orders and each of the error probabilities is based on a product of a minimum symbol distance of a modulation scheme to be used in one of the channels and the effective SINR of the one of the channels; and an adaptive modulator for setting the modulation schemes to be used in the channels according to the detection order corresponding to the selected terminal, and transmitting data using the modulation schemes to the selected terminal, wherein the user allocator selects the terminal by $$\max_{u(userT)} \left( \max_{i(detection\ order)} \left( \min_{k(Tx\ antenna)} \frac{g_{M_{ik}} \gamma_{ik}}{r_i} \right) \right)$$

where u is the index of a user, where i is the index of the detection order, k is the index of a transmit antenna, $g_M$ is a constant being the minimum symbol distance of the modulation scheme, γ is a signal-to-interference ratio (SIR) of the one of the channels, and r is a number of the channels with non-zero bits.

6. The apparatus of claim 5, wherein the allocated user selects the detection order by $$\max_{u(userT)} \left( \max_{i(detection\ order)} \left( \min_{k(Tx\ antenna)} \frac{g_{M_{ik}} \gamma_{ik}}{r_i} \right) \right)$$

where u is the index of a user, where i is the index of the detection order, k is the index of a transmit antenna, $g_M$ is the constant being the minimum symbol distance of the modulation scheme, γ is the SIR of the one of the channels, and r is the number of the channels wit non-zero bits.

7. A method of transmitting a detection order in a terminal in a spatial multiplexing-multi-input multi-output (SM-MIMO) system using equal power and adaptive rate for a plurality of transmit antennas, the method comprising the steps of:

calculating an effective signal-to-interference noise ratio (SINR) of each of a plurality of channels over each of a plurality of possible detection orders;

selecting a detection order that minimizes a highest of error probabilities of the channels from among the detection orders, wherein each of the error probabilities is based on a product of a minimum symbol distance of a modulation scheme to be used in one of the channels and the effective SINR of the one of the channels; and transmitting the selected detection order and modulation schemes to be used in the channels in accordance with the selected detection order to a base station, wherein the detection order selecting step comprises selecting the detection order by $$\max_{i(detection\ order)} \left( \min_{k(Tx\ antenna)} \frac{g_{M_{ik}} \gamma_{ik}}{r_i} \right)$$

where i is the index of the detection order, k is the index of a transmit antenna, $g_M$ is a constant being the minimum symbol distance of the modulation scheme, γ is a signal-to-interference ratio (SIR) of the one of the channels, and r is a number of the channels with non-zero bits.

8. The SM-MIMO method of claim 7, wherein the base station selects the terminal by $$\max_{u(users)} \left( \max_{i(detection\ order)} \left( \min_{k(Tx\ antenna)} \frac{g_{M_{ik}} \gamma_{ik}}{r_i} \right) \right)$$

where u is the index of a user, where i is the index of the detection order, k is the index of a transmit antenna, $g_M$ is the constant being the minimum symbol distance of the modulation scheme, γ is the SIR of the one of the channels, and r is the number of the channels with non-zero bits.

9. An apparatus for transmitting a detection order in a terminal in a spatial multiplexing-multi-input multi-output (SM-MIMO) system using equal power and adaptive rate for a plurality of transmit antennas, the apparatus comprising:

a calculator for calculating an effective signal-to-interference noise ratio (SINR) of each of a plurality of channels over each of a plurality of possible detection orders, selecting a detection order that minimizes a highest of error probabilities of the channels from among the detection orders, wherein each of the error probabilities is based on a product of a minimum symbol distance of a modulation scheme to be used in one of the channels and the effective SINR of the one of the channels, and transmitting the selected detection order and modulation schemes to be used in the channels in accordance with the selected detection order to a base station, wherein the calculator selects the detection order by $$\max_{i(detection\ order)} \left( \min_{k(Tx\ antenna)} \frac{g_{M_{ik}} \gamma_{ik}}{r_i} \right)$$

where i is the index of the detection order, k is the index of a transmit antenna, $g_M$ is a constant being the minimum symbol distance of the modulation scheme, $\gamma$ is a signal-to-interference ratio (SIR) of the one of the channels, and r is a number of the channels with non-zero bits.

10. The apparatus of claim 9, wherein the base station selects the detection order by $$\max_{u(users)} \left( \max_{i(detection\ order)} \left( \min_{k(Tx\ antenna)} \frac{g_{M_{ik}} \gamma_{ik}}{r_i} \right) \right)$$

where u is the index of a user, where i is the index of the detection order, k is the index of a transmit antenna, $g_M$ is the constant being the minimum symbol distance of the modulation scheme, $\gamma$ is the SIR of the one of the channels, and r is the number of the channels with non-zero bits.

\* \* \* \* \*